United States Patent [19]
Teramae

[11] Patent Number: 5,996,761
[45] Date of Patent: Dec. 7, 1999

[54] DAMPER MECHANISM WITH SPRING SEATS HAVING BALLS DISPOSED THEREIN FOR DECREASING FRICTIONAL RESISTANCE

[75] Inventor: Hiroshi Teramae, Neyagawa, Japan

[73] Assignee: Exedy Corporation, Neyagawa, Japan

[21] Appl. No.: 08/965,668

[22] Filed: Nov. 6, 1997

[30] Foreign Application Priority Data

Nov. 7, 1996 [JP] Japan .................................. 8-295138

[51] Int. Cl.$^6$ .............................. F16D 3/14; F16H 45/02
[52] U.S. Cl. ...................... 192/205; 192/213; 192/3.29; 464/66
[58] Field of Search ................................. 192/3.28, 3.29, 192/3.3, 205, 213; 464/66; 74/574

[56] References Cited

U.S. PATENT DOCUMENTS

| 4,430,064 | 2/1984 | Lamarche | 192/213 |
| 4,572,339 | 2/1986 | Koshimo | 192/3.29 |
| 4,790,792 | 12/1988 | Bopp | 192/213 X |

FOREIGN PATENT DOCUMENTS

305304  2/1929  United Kingdom ..................... 464/66

*Primary Examiner*—Charles A Marmor
*Assistant Examiner*—Ankur Parekh
*Attorney, Agent, or Firm*—Shinjyu An Intellectual Property Firm

[57] ABSTRACT

A frictional resistance between a spring seat and a retaining plate is suppressed to provide stable damper characteristics. A lockup damper mechanism 2 of a torque converter 1 is operable to transmit a torque from a front cover 3 to a turbine 5 and, at the same time, damp a vibration, and includes a piston 17, a driven plate 20, torsion springs 21, a retaining plate 19, spring seats 32 and balls 30. The torsion springs 21 elastically couples, in a rotating direction, the piston 17 and the driven plate 20 together. The retaining plate 19 restricts radially outward movement of the torsion springs 21. The spring seats 32 supports ends of the torsion springs 21. The balls 30 are contactable with the retaining plate 21, and are disposed between the retaining plate 21 and the spring seat 32.

9 Claims, 6 Drawing Sheets

DAMPER MECHANISM WITH SPRING SEATS HAVING BALLS DISPOSED THEREIN FOR DECREASING FRICTIONAL RESISTANCE

BACKGROUND OF THE INVENTION

A. Field of the Invention

The present invention relates to a damper mechanism, and in particular to a damper mechanism which transmits a torque from an input rotary member to an output rotary member and simultaneously dampens a vibration during torque transmission.

B. Description of the Background Art

In general, a damper mechanism transmits a torque from an input rotary member to an output rotary member and simultaneously dampens a vibration which may be transmitted from the input rotary member to the output rotary member. A lockup clutch damper mechanism (which will also be referred to as a "lockup dampery mechanism" hereinafter) disposed in a torque converter is one such damper mechanism.

Generally, the torque converter is internally provided with three types of vane wheels, an impeller, a turbine and a stator), and is operable to transmit a torque through a working fluid in the torque converter. The impeller is fixed to a front cover which coupled to the input rotary member for rotation therewith, and transmits torque to the turbine through the working fluid, which flows from the impeller to the turbine and then through the stator back to the impeller. The torque is then transmitted to the output rotary member which is coupled to the turbine.

The lockup damper mechanism is disposed between the turbine and the front cover for selectively mechanically coupling the front cover and the turbine together and thereby directly transmitting the torque from the front cover to the output rotary member.

Typically, the lockup damper mechanism has a piston which can be selectively pressed against the front cover, a retaining plate fixed to the piston, torsion springs supported by the retaining plate through spring seats, and a driven plate elastically coupled in the rotating direction of the damper mechanism to the piston by the torsion springs. The driven plate is fixed to the turbine. The spring seats support opposing ends of the torsion springs, are contactable with the retaining plate, and restrict the movement of the torsion springs in the rotating direction.

When the lockup damper mechanism operates, the torque is transmitted from the front cover to the piston, and then is transmitted through the torsion springs to the turbine. The lockup damper mechanism transmits the torque, and simultaneously dampens vibrations as a result of the torsion springs being compressed and then expanding between the driven plate and the retaining plate.

The torsion springs are restrained from radially outward movement by bent outer peripheral portions of the retaining plate, which will be referred to as outer bent portions hereinafter.

When the lockup damper mechanism rotates, centrifugal forces act on the torsion springs and other components, so that the torsion springs and spring seats are urged against the outer bent portions. When the torsion springs compress and expand with their spring seats urged against the outer bent portions, the damper characteristics change due to frictional resistance produced between the spring seats and the outer bent portions. As a result, it is necessary to employ the outer bent portions having a sufficiently large thickness because the friction caused by movement of the spring seats causes wear of the outer peripheral portions thereof. However, it is desired to reduce the thickness in order to reduce the weight of the lockup damper mechanism.

SUMMARY OF THE INVENTION

An object of the invention is to achieve stable damper characteristics by suppressing a frictional resistance between a spring seat member and an outer bent portion of a retaining plate or restricting member, and reduce a weight of the retaining plate for reducing a total weight of a damper mechanism.

In accordance one aspect of the present invention, a damper mechanism is used for transmitting torque from an input rotary member to an output rotary member and simultaneously damping a vibration transmitted from the input rotary member to the output rotary member. The damper mechanism includes an input member, an output member and an elastic member elastically coupling the input member and the output member together. A restricting member restricts radially outward movement of the elastic member. A seat member supports at least one end of the elastic member, the seat member including a spherical surface extending radially outward therefrom contacting the restricting member.

Preferably, the spherical surface is formed on a ball at least partially disposed in a portion of the seat member contactable with the restricting member.

Preferably, the seat member is formed with a recess facing the restricting member, and the ball is disposed in the recess.

Preferably, the input member is a piston of a lockup mechanism of a torque converter, the output member is fixed to a turbine of the torque converter.

Preferably, the seat member is formed with a working fluid passage open to the recess and an outer surface of the seat member for providing lubrication to the ball.

Preferably, the seat member is formed of first and second portions, the first portion formed with a concavity and a projection adjacent to the concavity. The second portion is formed with a concavity corresponding to the concavity in the first portions. The concavities in the first and second portions define the recess. The second portion is further formed with a hole configured to receive the projection.

Preferably, the elastic member includes first and second coil springs, the seat member being disposed between a first end of the first coil spring and a first end of the second coil spring.

Preferably, the first and second portions of the seat member are each formed with protrusions which extend into corresponding ones of the first ends of the first and second coil springs.

Preferably, the damper mechanism further includes a pair of second seat members, one of the second seat members being disposed at a second end of the first coil spring and another of the second seat members being disposed at a second end of the second coil spring.

Preferably, the second seat members are each formed with a recess and a ball disposed in the recess of the second seat member. Each of the second seat members is further formed with a protrusion that extends into a corresponding second end of the first and second coil springs.

Preferably, the first coil spring has a different rigidity than that of the second coil spring.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
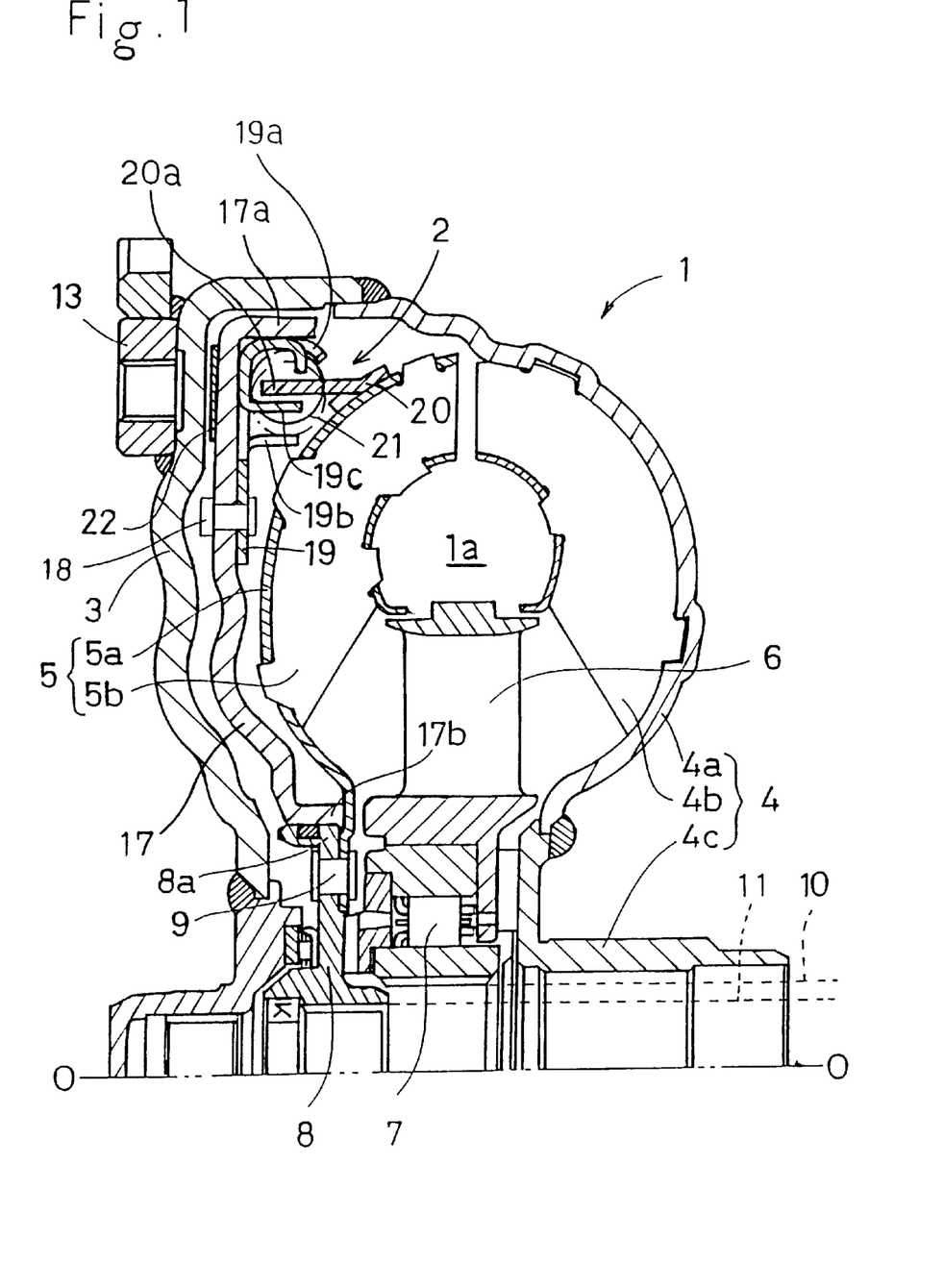
FIG. 1 is a fragmentary, schematic cross section side view of a torque converter employing a lockup damper mechanism of an embodiment of the invention.

FIG. 1 shows a torque converter 1 employing an embodiment of the invention. In FIG. 1, O—O represents a rotation axis of the torque converter 1. Although not shown, an engine is disposed on the left side of FIG. 1, and a transmission is disposed on the right side of FIG. 1. Hereinafter, the left side of FIG. 1 will be referred to as the engine side and the right side of FIG. 1 will be referred to as the transmission side.

The torque converter 1 is a mechanism for transmitting torque from a crank shaft of the engine to a main drive shaft 11 of the transmission, and is basically formed of a front cover 3 fixed to an input member, a torque converter main unit formed with three kinds of vane wheels, an impeller 4, a turbine 5 and a stator 6, and a lockup damper mechanism 2. The front cover 3 and an impeller shell 4a of the impeller 4 have outer peripheral portions welded together, and thereby define a working fluid chamber 1a therebetween.

A plurality of nuts 13 are fixed to a radially outer portion of an engine side surface of the front cover 3. Through the nuts 13, the front cover 3 is coupled to a flexible plate (not shown) which is in turn connected to the crank shaft of the engine. In this manner, the front cover 3 is coupled to the crank shaft of the engine.

The impeller 4 is formed of an impeller shell 4a having a plurality of impeller blades 4b fixed to an inner surface of the impeller shell 4a and an impeller hub 4c fixed to an inner peripheral edge of the impeller shell 4a.

The turbine 5 and the impeller 4 are disposed in the working fluid chamber 1a facing one another. The turbine 5 is formed with a turbine shell 5a, and a plurality of turbine blades 5b fixed to the turbine shell 5a. The inner peripheral edge of the turbine shell 5a is fixed to a flange 8a of the turbine hub 8 by a plurality of rivets 9. The inner periphery of the turbine hub 8 is coupled to the main drive shaft 11 by spline gear teeth.

The stator 6 is positioned axially between and radially inner sides of the impeller 4 and the turbine 5, and is fixed through a one-way clutch 7 to a stator shaft 10 which extends rigidly from a housing of the transmission.

The lockup damper mechanism 2 of the present invention is described below.

Figure 2:
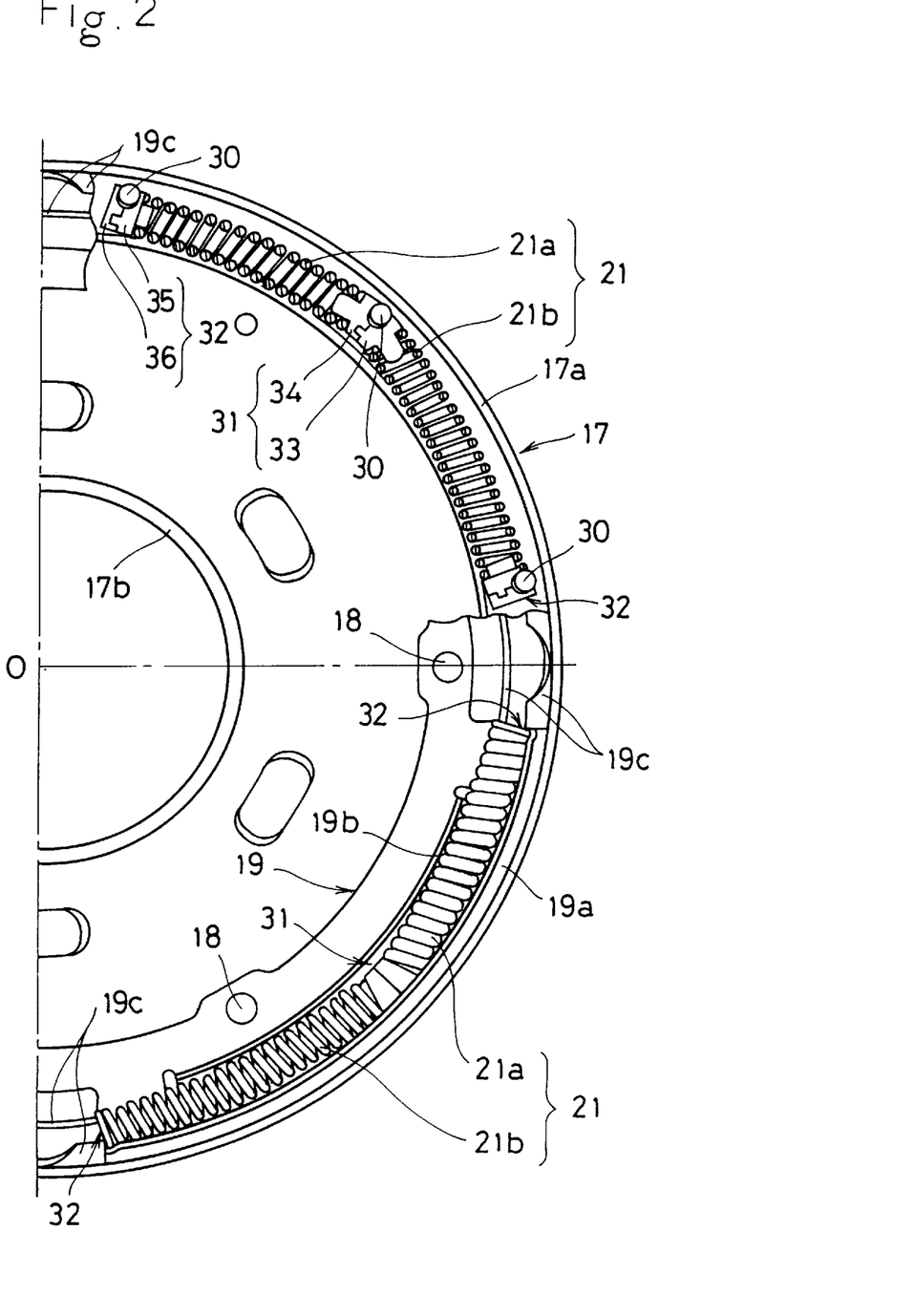
FIG. 2 is a fragmentary, part cut away, part cross section end view showing coil springs and intermediate spring seats of the lockup damper mechanism depicted in FIG. 1.
Figure 3:
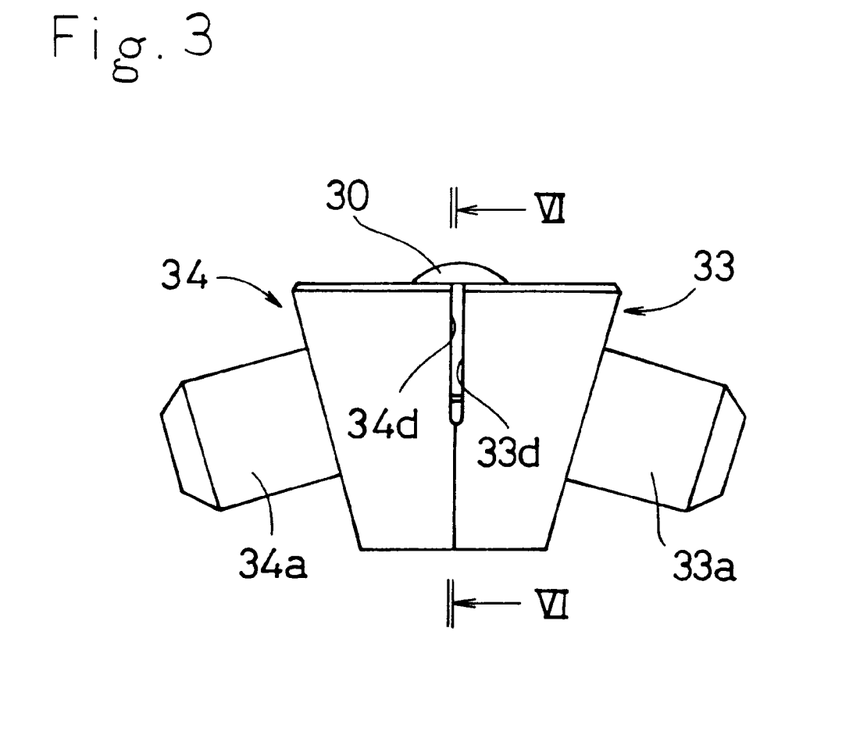
FIG. 3 is an elevational end view of one intermediate spring seat shown removed from the lockup damper mechanism depicted in FIGS. 1 and 2.
Figure 4:
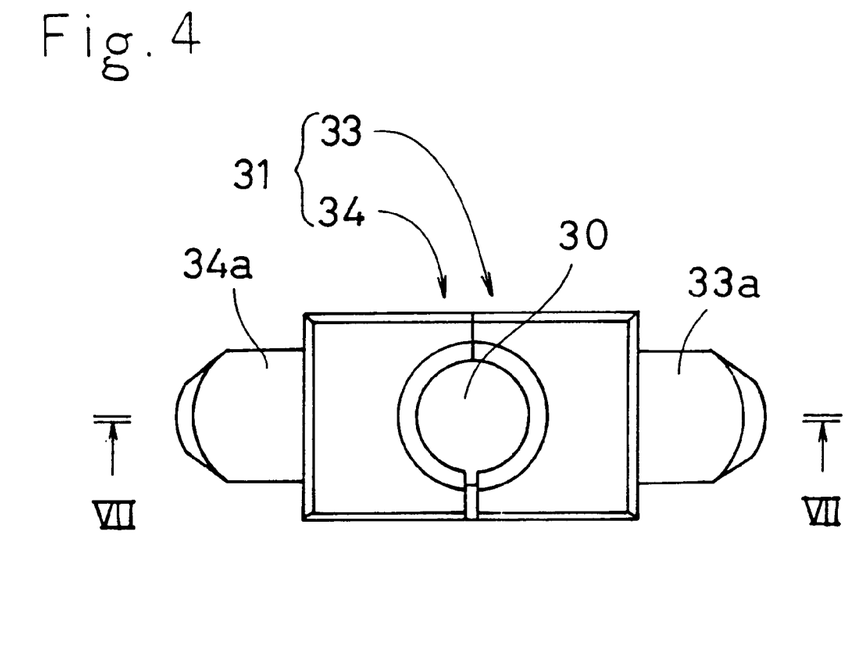
FIG. 4 is an elevational top view of the intermediate spring seat depicted in FIG. 3.
Figure 5:
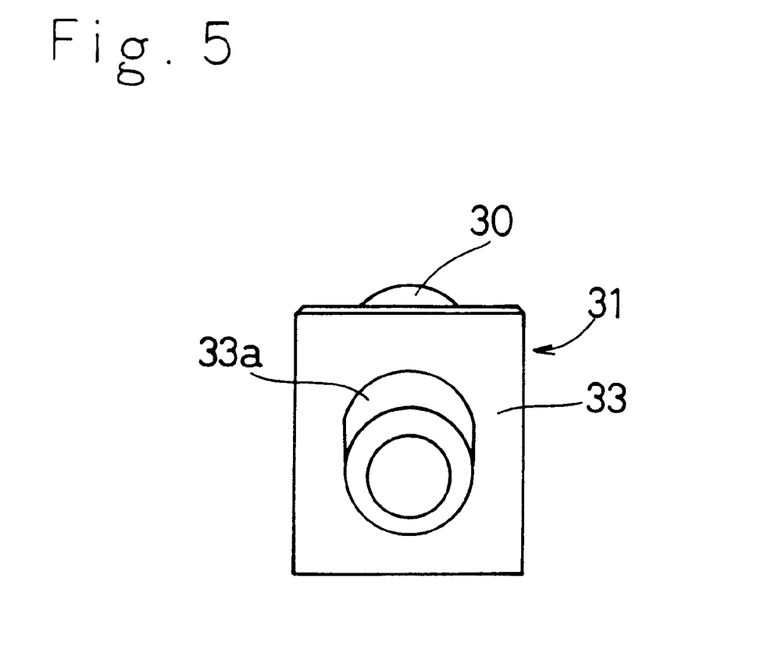
FIG. 5 is an elevational side view of the intermediate spring seat depicted in FIGS. 3 and 4.
Figure 6:
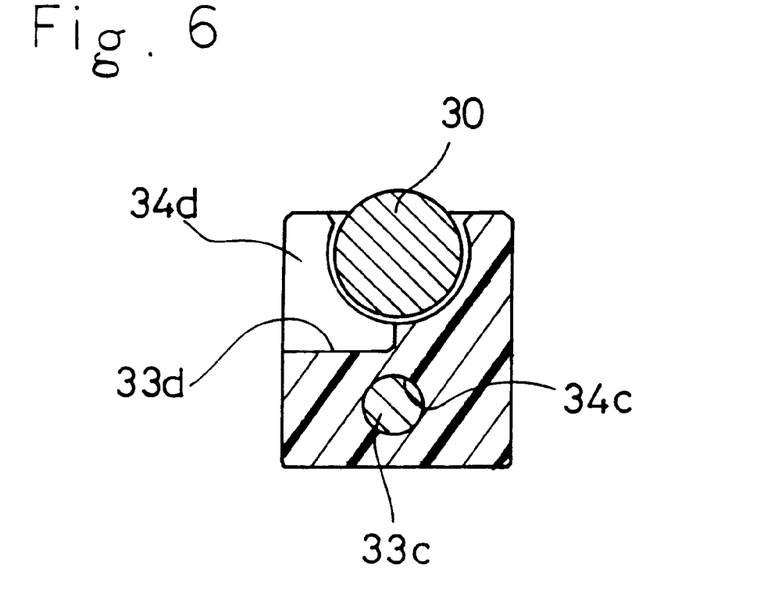
FIG. 6 is a cross section taken along line VI—VI in FIG. 3.
Figure 7:
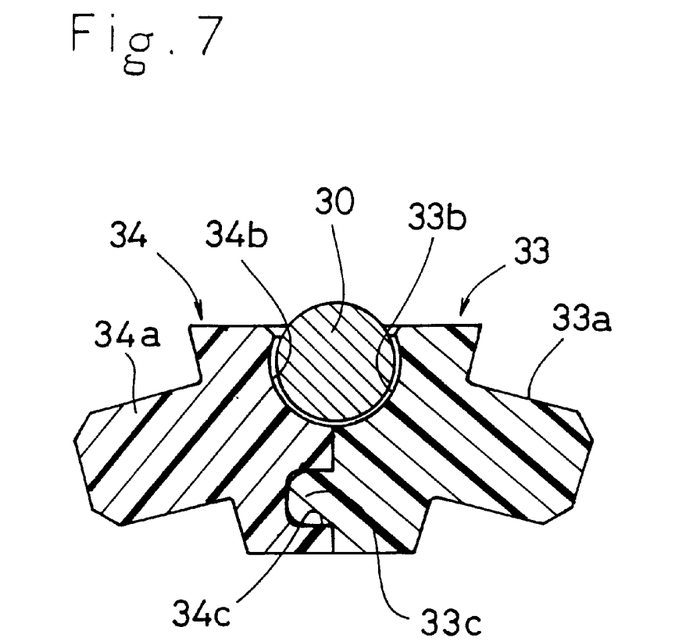
FIG. 7 is a cross section taken along line VII—VII in FIG. 4.

The lockup damper mechanism 2 is disposed axially between the front cover 3 and the turbine 5. As shown in FIGS. 1 and 2, the lockup damper mechanism 2 is basically includes a piston (input member) 17, a driven plate (output member) 20, torsion springs (elastic members) 21, a retaining plate (restricting member) 19 and balls 30.

The piston 17 has an annular shape, and is provided at outer and inner peripheries with cylindrical portions 17a and 17b, respectively, which extend toward the transmission side. The inner cylindrical portion 17b is axially and circumferentially slidably carried by an outer peripheral wall of the turbine hub 8. An annular facing member 22 is fixed to an outer peripheral portion of the piston 17. The annular facing member 22 is opposed to a friction surface formed of an inner surface of a radially outer portion of the front cover 3.

The retaining plate 19 is disposed radially inside the cylindrical portion 17a at the outer periphery of the piston 17, and has a radially inner edge fixed to the piston 17 by rivets 18. The retaining plate 19 is provided with outer bent portions 19a, cut and bent portions 19b and spring engagement claws 19c, as shown in FIGS. 1 and 2. Each outer bent portion 19a is formed by bending an outer peripheral portion of the retaining plate 19 toward the transmission side and further bending the end portion thereof radially inward. Each cut and bent portion 19b is located radially inside the outer bent portion 19a, and is prepared by bending a partially cut portion toward the transmission. Each spring engagement claw 19c is formed between each pair of adjacent outer bent portions 19a.

Each torsion spring 21 is formed of elastic component members, i.e., first and second springs 21a and 21b, as shown in FIG. 2. The first spring 21a has a spring rigidity higher than that of the second spring 21b. The torsion springs 21 are provided for elastically coupling the piston 17 and the driven plate 20 together in the rotating direction, and are radially supported by the outer bent portions 19a located at the radially outer position and the cut and bent portions 19b located at the radially inner position. The first and second springs 21a and 21b are coupled together by an intermediate spring seat 31, which is described in greater detail below. The opposite ends, in the circumferential direction of the damper mechanism, of each torsion spring 21, i.e., an end of the first spring 21a and an end of the second spring 21b are seated on spring seats 32, of which circumferential movement is restricted by the spring engagement claws 19c.

The intermediate spring seat 31 is made of resin, and is formed of a second seat member 34 which contacts the first spring 21a and a first seat member 33 which contacts the second spring 21b. The intermediate spring seat 31 is shown in FIGS. 3, 4, 5, 6 and 7. Both the seat members 34 and 33 have columnar portions 34a and 33a which extend into the first and second springs 21a and 21b, respectively, hemispherical recesses 34b and 33b which retain the ball 30, and grooves 34d and 33d, respectively. The columnar portions 34a and 33a are inclined at appropriate angles so that the intermediate spring seat 31 can engage the first and second springs 21a and 21b with little bending of the springs along their length (where the length of each spring is measured along the circumferential direction of the torque converter 1). The second seat member 34 is formed with a hole 34c, and the first seat member 33 is formed with a projection 33c that is fitted into the hole 34c. When both the seat members 34 and 33 are joined together, the ball 30 is accommodated in the recesses 34b and 33b and the projection 33c is fitted into the hole 34c. In this state, the ball 30 is held in the concavity defined by the recesses 34b and 33b, and the ball 30 is integrated with the intermediate spring seat 31. Since both the seat members 34 and 33 are made of resin, both can be easily engaged with each other.

Figure 8:
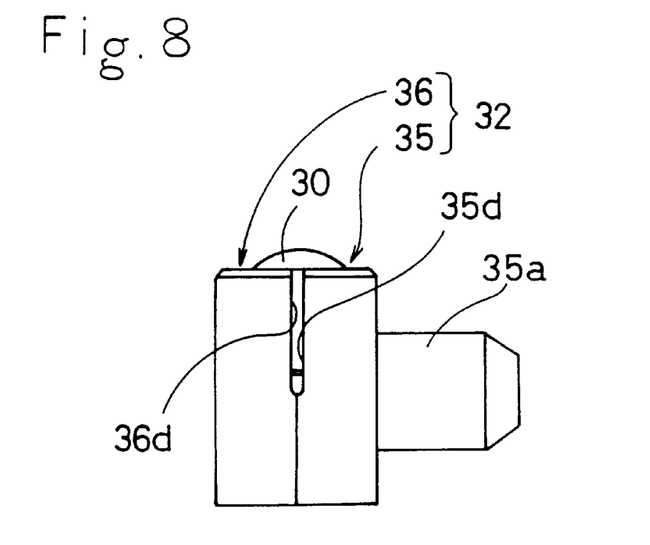
FIG. 8 is an elevational end view of another type of spring seat shown removed from the lockup damper mechanism depicted in FIGS. 1 and 2.
Figure 9:
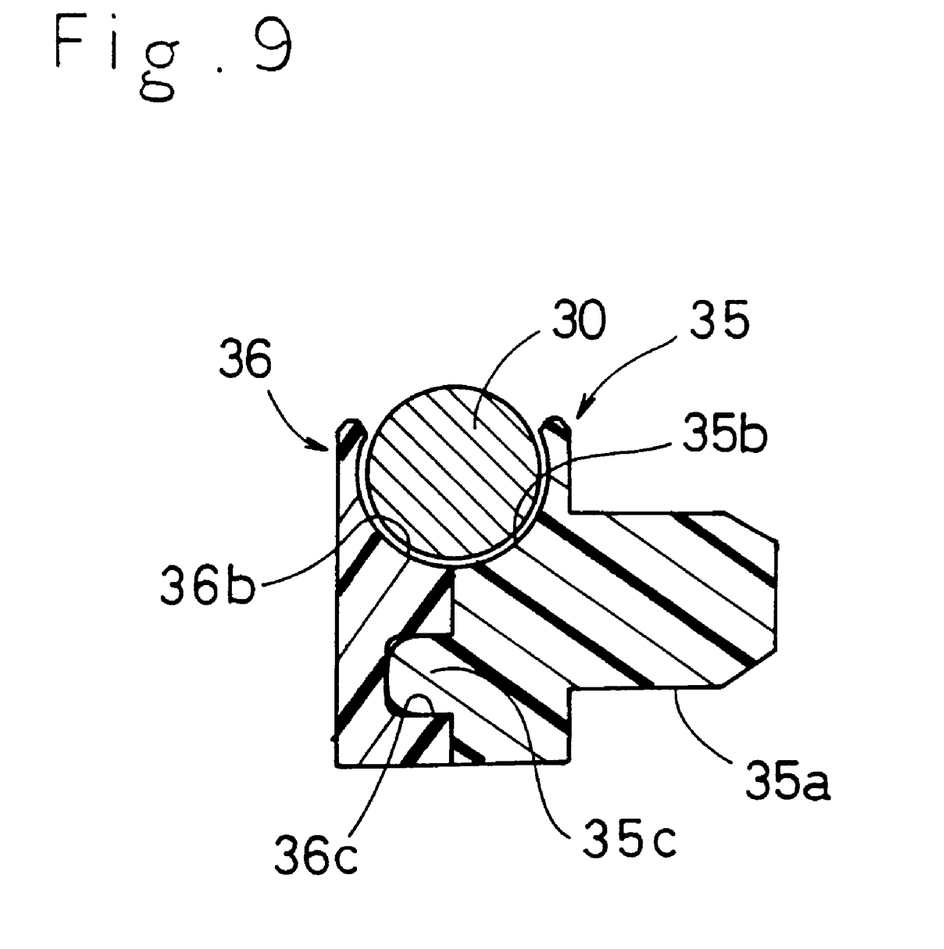
FIG. 9 is a cross section of the spring seat depicted in FIG. 8.

The spring seat 32 is shown in FIGS. 8 and 9. The spring seat 32 is made of resin and is formed of a first seat member 35. For each pair of springs, first spring 21a and the second spring 21b, there are two spring seats 32, one spring seat 32 contacting one end of the first spring 21a and one spring seat 32 contacting the second spring 21b. The first seat member 35 contacts the corresponding spring, i.e. the first spring 21a or the second spring 21b. The spring seat 32 also includes a second seat member 36 which contacts the cut and bent portion 19b of the retaining plate 19. Both the seat members 35 and 36 have hemispherical recesses 35b and 36b for holding the ball 30, and also have grooves 35d and 36d, respectively. Further, the second seat member 36 has a hole 36c. The first seat member 35 has a projection 35c fitted into the hole 36c and a columnar portion 35a inserted into the corresponding spring. When both the seat members 35 and 36 are mated together such that the ball 30 is accommodated in the recesses 35b and 36b and the projection 35c is fitted into the hole 36c, the ball 30 is held in the concavity formed of the recesses 35b and 36b, so that the ball 30 is integrated with the spring seat 32.

Since the columnar portions 33a, 34a and 35a can be fitted into the first and second springs 21a and 21b, this facilitates coupling of the springs 21a and 21b as well as attachment of the spring seat 32 to the torsion spring 21. Since the balls 30 can be arranged in the assembled spring seats 31 and 32, the balls 30 can be handled easily in the assembling operation.

The driven plate 20 has a ring-like form, and is fixed to a surface of the turbine shell 5a opposed to the engine. The driven plate 20 is provided with a plurality of bent claws 20, which are engaged with the second seat members 36 of the spring seats 32 located at the circumferentially opposite ends of each torsion spring 21.

An operation of the torque convertor 1 is described below.

Torque is applied from the crank shaft of the engine to the front cover 3 through the flexible plate (not shown). Torque is transmitted to the impeller shell 4a. Thereby, the impeller 4 rotates, and the working fluid flows from the impeller 4 to the turbine 5. The flow of the working fluid rotates the turbine 5, so that the torque of the turbine 5 is output to the main drive shaft 11 through the turbine hub 8.

When a speed ratio of the torque converter 1 increases and the main drive shaft 11 attains a constant rotation speed, the working fluid in a gap between the piston 17 and the front cover 3 may be drained through an internal space of the main drive shaft 11. As a result, a hydraulic pressure difference pushes the piston 17 toward the front cover 3, and the facing member 22 is pressed against the friction surface of the front cover 3. Thereby, the torque of the front cover 3 is transmitted from the piston 17 to the turbine 5 through the lockup damper mechanism 2. Thus, the front cover 3 is mechanically coupled to the turbine 5, so that the torque of the front cover 3 is output to the main drive shaft 11 through the turbine 5.

In this operation, the lockup damper mechanism 2 transmits the torque, and simultaneously dampens the vibration transmitted from the front cover 3 to the main drive shaft 11.

When the vibration is applied from the front cover 3 to the lockup damper mechanism 2, the torsion springs 21 repeatedly undergo compression and expansion between the retaining plate 19 fixed to the piston 17 and the driven plate 20. During this operation, sliding occurs between the torsion springs 21 and the retaining plate 19, so that a sliding resistance (hysteresis torque) occurs between them. This dampens the applied vibration.

The torsion spring 21 is formed of the first and second springs 21a and 21b which have different rigidities, respectively, and are coupled together in series, so that it provides spring characteristics of a wide torsion angle and two different compression gradients. Therefore, the vibration in a wide range can be efficiently damped.

When the lockup damper mechanism 2 operates, a centrifugal force acts radially outward on the torsion springs 21 as well as the intermediate spring seats 31 and the spring seats 32 carrying the springs 21. In the prior art, therefore, sliding occurs between the retaining plate and the spring seats pressed against the same, so that friction between them causes an unnecessary resistance. Generation of this unstable resistance adversely affects the damper characteristics.

In order to suppress the above unstable resistance, the present invention employs the balls 30, each of which rotates between the intermediate spring seat 31 or the spring seat 32 and the outer bent portion 19a of the retaining plate 19. Therefore, the intermediate spring seats 31 and the spring seats 32 can slide smoothly on the outer bent portions 19a of the retaining plate 19, so that generation of the unstable resistance can be suppressed, and the damper characteristics can be stable.

The intermediate spring seat 31 has a working fluid passage in the form of the grooves 33d and 34d. The spring seat 32 has a working fluid passage in the form of the grooves 35d and 36d. The working fluid introduced through these working fluid passages functions as a lubricant and reduces a frictional resistance of the intermediate springs seats 31 and the spring seats 32 with respect to the balls 30, so that the balls can roll smoothly. This achieves further smooth sliding of the intermediate spring seats 31 and the spring seat 32 with respect to the outer bent portions 19a of the retaining plate 19.

ALTERNATE EMBODIMENT

In the embodiment described above, the balls 30 are held in the concavities formed of the recesses 35b and 36b in the spring seats 32 and the concavities formed of the recesses 34b and 33b in the intermediate spring seats 31, and the frictional resistance of the seats 31 and 32 with respect to the retaining plate 19 is reduced owing to the rolling of the balls 30.

Alternatively, the seats 31 and 32 may be provided at the surfaces opposed to the retaining plate 19 with grooves, and a plurality of rollers may be arranged in these grooves so that the frictional resistance of the seats 31 and 32 with respect to the retaining plate 19 may be reduced owing to the rolling of the rollers.

Without employing the rolling balls and rollers, the seats 31 and 32 may be provided at the surfaces opposed to the retaining plate 19 with hemispherical projections for reducing the frictional resistance of the seats 31 and 32 with respect to the retaining plate 19.

According to the invention, since the ball or roller is arranged between the retaining plate (restricting member) and the spring seat (seat member), the frictional resistance between the outer bent portion of the retaining plate and the spring seat is reduced, so that the damper characteristics can be stable. Since the frictional wear of the restricting member and the seat member is suppressed, the thickness of the retaining plate can be reduced, and the whole weight of the damper mechanism can be reduced.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. In a power transmission for transmitting torque from a transmission input rotary side to a transmission output rotary side, a damper mechanism for damping vibration transmitted from the transmission input to output rotary sides, the damper mechanism comprising:

an input member rotatable about a power transmission axis for receiving input torque from a power transmission input member;

an output member rotatable about the power transmission axis for transmitting torque from the damping mechanism to a power transmission output member;

an elastic member that circumferentially and elastically couples said input member and said output member together;

a restricting member supported on a radially outer portion of said input member, said restricting member for restricting radially outward movement of said elastic member; and a seat member for circumferentially supporting at least one end of said elastic member, said seat member being formed with a recess facing said restricting member and including a spherical surface radially outward with respect to said power transmission axis and opposed to a radially inward surface of said restricting member said spherical surface formed by a ball retained in said recess, wherein said spherical surface is contactable with the radially inward surface of said restricting member.

2. The damper mechanism as set forth in claim 1, wherein said input member is a piston of a lockup mechanism of a torque converter, said output member is fixed to a turbine of said torque converter.

3. The damper mechanism as set forth in claim 2, wherein said seat member is formed with a working fluid passage open to said recess and an outer surface of said seat member for providing lubrication to said ball.

4. The damper mechanism as set forth in claim 3, wherein said seat member is formed of first and second portions, said first portion formed with a concavity and a projection adjacent to said concavity, said second portion being formed with a concavity corresponding to said concavity in said first portions, said concavities in said first and second portions defining said recess, said second portion further formed with a hole configured to receive said projection.

5. The damper mechanism as set forth in claim 4, wherein said elastic member comprises first and second coil springs, said seat member being disposed between a first end of said first coil spring and a first end of said second coil spring.

6. The damper mechanism as set forth in claim 5, wherein said first and second portions of said seat member are each formed with protrusions which extend into corresponding ones of said first ends of said first and second coil springs.

7. The damper mechanism as set forth in claim 6, further comprising a pair of second seat members, one of said second seat members being disposed at a second end of said first coil spring and another of said second seat members being disposed at a second end of said second coil spring.

8. The damper mechanism as set forth in claim 7, wherein said second seat members are each formed with a recess and a ball disposed in said recess of said second seat member, each of said second seat members further formed with a protrusion that extends into a corresponding second end of said first and second coil springs.

9. The damper mechanism as set forth in claim 8, wherein said first coil spring has a different rigidity than that of said second coil spring.

* * * * *